United States Patent [19]

Anderson

[11] Patent Number: 4,519,941

[45] Date of Patent: May 28, 1985

[54] METAL-FILLED POLYIMIDE/POLYEPOXIDE BLENDS OF IMPROVED ELECTRICAL CONDUCTIVITY

[75] Inventor: Stephen P. Anderson, South Gate, Calif.

[73] Assignee: National Starch and Chemical Corporation, Bridgewater, N.J.

[21] Appl. No.: 621,360

[22] Filed: Jun. 15, 1984

Related U.S. Application Data

[63] Continuation-in-part of Ser. No. 521,791, Aug. 9, 1983, abandoned.

[51] Int. Cl.$^3$ ................................. A01B 1/06
[52] U.S. Cl. .................................. 252/514; 523/457; 524/439; 524/440
[58] Field of Search ............ 252/514; 528/353; 525/423; 523/457; 524/439, 440

[56] References Cited

U.S. PATENT DOCUMENTS

| | | | |
|---|---|---|---|
| 3,458,595 | 7/1969 | Ulmer | 260/830 |
| 3,663,651 | 5/1972 | Traut | 260/830 P |
| 3,933,745 | 1/1976 | Bargain et al. | 528/224 |
| 4,075,171 | 2/1978 | D'Alelio | 528/353 |
| 4,124,651 | 11/1978 | Lohmann et al. | 528/353 |
| 4,210,704 | 7/1980 | Chandross et al. | 252/514 |
| 4,277,583 | 7/1981 | Waitkus et al. | 260/830 P |
| 4,374,214 | 2/1983 | Holub et al. | 523/466 |

FOREIGN PATENT DOCUMENTS

| | | |
|---|---|---|
| 0077718 | 4/1983 | European Pat. Off. |
| 50-15488 | 6/1975 | Japan . |
| 51-90400 | 8/1976 | Japan . |
| 52-59633 | 5/1977 | Japan . |

*Primary Examiner*—Josephine L. Barr
*Attorney, Agent, or Firm*—Margaret B. Kelley; Edwin M. Szala

[57] ABSTRACT

Metal-filled polyimide/polyepoxide blends, characterized by their improved electrical conductivity after curing over blends containing no polyepoxide, comprise carbinol-containing polyimides, conventional liquid polyepoxides, a solvent for the polyimide, noble metal powders (preferably silver), and optionally an amine catalytic curing agent. Conductivity improvements of 100–1000 fold or more are observed.

20 Claims, No Drawings

METAL-FILLED POLYIMIDE/POLYEPOXIDE BLENDS OF IMPROVED ELECTRICAL CONDUCTIVITY

This application is a continuation-in-part of Ser. No. 521,791 filed Aug. 9, 1983, now abandoned.

BACKGROUND OF THE INVENTION

This invention relates to improved electrically conductive resins based on noble metal-filled blends of carbinol-containing polyimides and conventional liquid polyepoxides, their preparation, and their use as self-crosslinking adhesives.

It is known in the art to combine polyepoxides with polyimides or polyamide-polyimide resins or their precursors. See for example, Japan. Kokai 76 90,400 (C.A. 85 193528q) where polyimide resins with improved heat resistance were prepared by reacting maleic anhydride with diamines and epoxy resins; Japan. Kokai 77 59,633 (C.A. 87 169355b) where a polyimide solution was stirred with an epoxy resin and used as a coating for electrical insulators; Japan 75 14,488 (C.A. 83 194591a) where a polyamide-polyimide resin was blended with an epoxy resin and used as an adhesive; and U.S. Pat. No. 4,374,214 (issued Feb. 15, 1983 to F. F. Holub) where a bismaleimide, selected arylene diamines, and an organic peroxide were blended with an epoxy resin to provide curable blends useful for making composite materials and molding articles with good resistance to mechanical deformation at elevated temperatures and good adhesion to inorganic materials such as metals and ceramics.

It is also known to add an amide-imide powder, anhydride-terminated polyamic acid, or amine-terminated polyimide to epoxy compounds to give crosslinked polyimide-epoxy polymers. See, for example, the epoxidized electrostatic coating powder prepared by curing an epoxy resin by mixing the resin with a finely divided solid solution of the amide-imide powder in an organic anhydride, the crosslinking being effected by the anhydride in the powder (U.S. Pat. No. 3,458,595 issued July 29, 1969 to W. W. Ulmer); the resins prepared by crosslinking the reaction products of anhydride-terminated, polyamic acids and epoxy compounds to give resins with "superior thermal stability and electrical properties, especially dielectric values" (see Col. 1, lines 42-50 of U.S. Pat. No. 3,663,651 issued May 16, 1972 to G. R. Trout); and the tractable, heat- and solvent-resistant polymers prepared using amine-terminated polyimides copolymerized with polyepoxides (see U.S. Pat. No. 4,277,583 issued July 7, 1981 to P. A. Waitkus et al.).

It is also known to crosslink carbinol-containing polyimides with other compounds containing reactive groups such as isocyanates, epoxides, (e.g., diglycidyl ether of bis-phenol A), alkyl titanates, carboxylic acid anhydrides, carboxylic acid halides, and siloxanes (see page 15, lines 12-16 of European Patent Application No. 82401866.7 published under No. 0 077 718 on Apr. 27, 1983). It is also noted therein that it is possible to add inert constituents such as pigment dyes, organic, inorganic or metallic fillers, adhesive powders, heat- and oxidation-stabilizing additives, foaming agents, etc.

It is further known to add powdered metallic fillers, such as nickel or preferably silver or gold because of their better conductivity, to epoxy resins or polyimide resins to provide adhesives, coatings, moldings and the like which are electrically conductive. However, good conductivity is not always achieved even with high percent metal loading. See, for example, U.S. Pat. No. 4,210,704 (issued July 1, 1980 to E. A. Chandross et al.), where it is disclosed that a conductivity enhancer is used in silver-filled epoxy resin adhesive formulations to increase conductivity and lower resistivity.

Metal-filled polyimides are preferred for most applications. There is therefore a need for metal-filled polyimides of improved conductivity.

SUMMARY OF THE INVENTION

The present invention provides a metal-filled polyimide/polyepoxide blend, characterized by its improved conductivity after curing over the blend without polyepoxide, which comprises:

(a) about 25-50% of a carbinol-containing polyimide consisting essentially of a repeat unit having the structure:

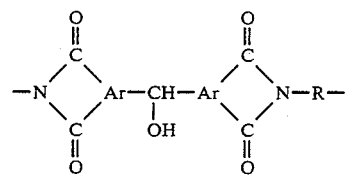

wherein Ar is the same or different aromatic radical with the two pairs of attached carbonyl groups situated on adjacent carbon atoms in the Ar radical and R is a divalent aliphatic, cycloaliphatic, aromatic, or heterocyclic radical;

(b) about 1-35% of a liquid substituted or unsubstituted alphatic, cycloaliphatic, aromatic, and/or heterocyclic polyepoxide containing at least two epoxy groups; and (c) about 15-74% of an organic solvent for the polyimide; the percentages of (a), (b), and (c) being by weight and totaling 100%; and (d) about 45-90% by weight of an electrically conductive noble metal powder; the percentage of (d) being by weight based on the total weight of the polyimide and polyepoxide.

The blends show an unexpected improvement in electrical conductivity following cure. The cured products show good thermal stability and satisfactory to good tensile shear strength. The inclusion of the polyepoxide also increases the wet time (i.e. the handling time) and, in addition, some of the polyepoxides in the uncured state act as good secondary solvents for the polyimides, thus reducing the viscosity of the metal-filled resin blends. Further, they do not require the use of an additional catalyst for the cure of either the polyimide or the polyepoxide. If desired, typical catalytic amine curing agents may be added to the adhesives.

Preferably, the blends contain 25-40% polyimide, 6-32% polyepoxide, and 25-70% solvent and most preferably 30-40%, 15-25%, and 30-55%, respectively. The preferred amount of metal powder in the blend is 50-85%, most preferably 55-80%. If used, the catalytic curing agent is present in amounts of 1-8% by weight based on the weight of polyepoxide in the blend.

DESCRIPTION OF THE PREFERRED EMBODIMENTS

The polyimides useful herein are anhydride, acid, ester, and/or amine terminated polyimides which contain self-crosslinking carbinol moieties and preferably flexibilizing moieties. They are prepared by reacting a suitable carbinol-containing tetracarboxylic acid compound, e.g., the bis(methyl half-ester) of 3,3',4,4'-benzhydroltetracarboxylic acid, with a polyfunctional aliphatic, cycloaliphatic, aromatic or heterocyclic primary polyamine, preferably a diamine containing flexibilizing moieties. The reaction is carried out in an inert organic solvent which is a solvent for the polyimide. The temperature used should be sufficient to effect polymerization and imidization (i.e., ring closure to the imide).

Suitable diaryl carbinol-containing tetracarboxylic acid compounds include:

(a) dianhydrides having the formula

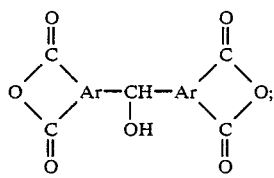

(b) tetraacids having the formula

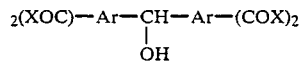

where X is —OH; and (c) preferably diester-diacids having the formula

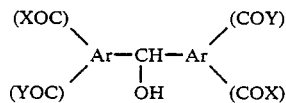

where X is —OH and Y is —OR',
or isomers thereof. Ar is as defined hereinabove. R' is the same or a different lower alkyl group, typically $C_1$-$C_{10}$, preferably $C_1$-$C_4$, and most preferably $C_1$-$C_2$. The dihaloformyl diesters are also known as useful for the preparation of polyimides and may be suitable for use herein. It may be possible to use a mixture of carbinol-containing and non-carbinol containing tetracarboxylic acid compounds.

Typical are 3,3',4,4'-benzhydroltetracarboxylic acid, the dianhydride thereof or the diester-diacid thereof such as the bis(methyl half ester) whose preparation is described in Example I. Such polyimides are disclosed in European Patent Application No. 82401866.7 (cited previously). The polyimides therein are prepared by reacting an aromatic diamine with a tetraester or with a diester-diacid derived from benzhydrol-3,3',4,4'-tetracarboxylic acid using an excess of either monomer or preferably using approximately equimolar amounts of the monomers dissolved in an appropriate solvent.

It is preferred herein to use an excess of the tetracarboxylic acid compound or to use a stoichiometric amount of the tetracarboxylic acid compound and polyamine. While the polyimides prepared with an excess of polyamine are satisfactory, the presence of residual unreacted polyamine is not desirable since the amines are toxic and also readily oxidized.

Suitable polyfunctional amines include the aliphatic, cycloaliphatic, aromatic and heterocyclic amines well-known in the art and listed in U.S. Pat. No. 3,528,950 issued Sept. 15, 1970 to H. R. Lubowitz. Aromatic diamines containing flexibilizing moieties, e.g., 4,4'-methylenedianiline, 4,4'oxydianiline, 4,4'-sulfonyldianiline, 4,4'-bis(3-aminobenzoyl)diphenyl ether, and 1,3-bis(3-aminophenoxy)benzene are preferred. However, m-phenylenediamine, an aromatic diamine which contains no flexibilizing moieties, is also useful herein. Aliphatic diamines suitable for use herein include bis(3-aminopropyl)tetramethyl disiloxane and 1,6-hexanediamine.

One or more of the polyamines or diamines described hereinabove are reacted in a suitable inert organic solvent with the carbinol-containing tetracarboxylic acid compound. Reaction conditions used for the preparation of the polyimides herein, will depend, not only upon the diamine used, but more particularly on the tetracarboxylic acid compound used. They will also depend upon the solvent selected and the concentration and molecular weight of the polyamic intermediate desired in the final solution to be imidized. Fully imidized polymers are preferred as they possess maximum resistance to heat and oxidation and release no volatile by-product(s) during use. The reactions are carried out under anhydrous conditions preferably using pure monomers and dry solvents. The molecular weight is controlled by the stoichiometry, as well as the reaction time and temperature. Low molecular weight polyimides are preferred. It is possible to recover the polyimide resin in dry form (by precipitation with a non-solvent such as water) but it would then have to be dissolved in a suitable solvent before admixture with the epoxy resin.

The reaction mixture formed by the solvent and the reagents is heated at a temperature of 80° C. or above, preferably 100°–150° C., until the composition reaches the desired inherent viscosity (about 0.1 dl/g).

The solvents used should dissolve at least one of the reactants, preferably both, and should be a good solvent for the fully imidized resin. The carbinol-containing polyimides are more soluble than conventional polyimides (as discussed in European Patent Application No. 82401866.7 cited previously). Suitable solvents include, for example, dimethylformamide, dimethylacetamide, N-methyl-2-pyrrolidinone (herein referred to as N-methylpyrrolidinone), N-cocoalkyl-2-pyrrolidone, N-(2-hydroxyethyl)-2-pyrrolidone, N-(N,N-dimethylamino)-propyl-2-pyrrolidone, triethylene glycol dimethyl ether (triglyme), diethylene glycol dimethyl ether (diglyme), diethylene glycol ethyl ether, γ-butyrolactone, 2-(2-ethoxy)ethyl acetate (carbitol acetate), 2-butoxyethyl acetate (butyl cellosolve acetate), and the like. These solvents can be used alone or in combination with other solvents such as benzene, benzonitrile, dioxane, xylene, toluene and cyclohexane. The preferred solvent is N-methylpyrrolidinone.

It is desirable to store the polyimide blends under dry conditions prior to use. It may be possible to use blends of carbinol-containing and non-carbinol-containing polyimides provided the carbinol groups are present in an amount sufficient to provide the improved conductivity.

The liquid polyepoxides suitable for use herein are conventional and include aliphatic, cycloaliphatic, aromatic and/or heterocyclic polyepoxides, e.g., glycidyl esters, glycidyl ethers, or epoxidized olefins, which contain at least two epoxide groups and which may be substituted with non-interfering substituents. They typically have an epoxide equivalent weight of about 130–190. As will be shown hereafter, solid polyepoxides and liquid monopolyepoxides are not suitable for use herein. U.S. Pat. No. 3,547,885 issued Dec. 15, 1970 to M. F. Dante et al., U.S. Pat. No. 3,746,686 issued July 17, 1973 to C. D. Marshall, and U.S. Pat. No. 4,066,624 issued Jan. 3, 1978 to J. C. Bolger describe some suitable polyepoxides. The preferred polyepoxides, such as 1,4-butanediol diglycidyl ether and an alicyclic diepoxycarboxylate, are of low molecular weight and low viscosity. Also useful are medium viscosity polyepoxides such as the glycidyl polyethers prepared from epichlorohydrin and bisphenol A (4,4'-isopropylidenediphenol prepared from phenol and acetone) or bisphenol F (prepared from phenol and formaldehyde). High viscosity polyepoxides, such as the novalaks (phenolformaldehyde soluble resins), are also suitable.

Suitable metal powders (flakes) include electrically conductive noble metal powders. As used herein, the term noble metal refers to a metal that is not easily oxidized such as gold, silver, platinum, palladium, irridium, rhodium, mercury, ruthenium, and osmium. Mixtures of metals may be used. The preferred metal is silver.

The metal-filled polyimide/polyepoxide blends are prepared by mixing the components until the mixture is smooth and consistent. Preferably the liquid components are mixed and the metal is added thereto. The blends are useful as adhesives, coatings, moldings, or in other applications where polyimides are typically used and where conductive properties are required. They are usually used as smooth viscous solutions which can be applied to suitably prepared substrate surfaces (e.g. printed ceramic substrates); if desired, they may be formulated with other fillers (i.e. non-metals), thickeners, pigments, etc. Alternatively, they may be cast into a film from solution and then applied. If necessary, the substrates are allowed to stand prior to assembly to permit some or all of the solvent to evaporate. The treated surfaces to be bonded are assembled together by means of a clamp or press and the assembled substrates are cured.

The resins in the blends are co-cured by heating to provide crosslinked products. Heat curing may be carried out at a low temperature, i.e. about 100°–250° C. for about 0.5 to 2 hours, preferably at about 150° C. for about 0.5–1 hour to remove the solvent followed by a further cure for about 1 hour at about 200° C. These curing temperatures are about 75° C. lower than those required to cure conventional metal-filled polyimides. Longer curing times at the lower temperatures and shorter curing times at the higher temperatures may be used, and it is within the skill of one in the art to determine appropriate curing times and temperatures. Higher molecular weight polyimides, depending upon the amine used in their preparation, may require higher curing temperatures to exceed the softening point of the resin.

When adhesives are being prepared, it may be desirable in some blends to use an amine catalytic curing agent known to be useful with polyepoxides. Such catalysts include 1,5-diazobicyclo(5.4.0)undec-5-ene, benzyldimethylamine, N,N-dimethylpiperazine, triethylenediamine, 2-ethyl-4-methylimidazole, and the like. In some cases, the use of the catalyst improves the tensile shear strength of the adhesive bond.

It can be appreciated that a large number of variations may be effected in preparation of the polyimide, such as the selection of starting materials and molar ratios, and in the selection of the polyepoxide, metal powder, and solvent, as well as in the preparation and use procedures herein, without materially departing from the scope and spirit of the invention. Such variations will be apparent to those skilled in the art and are to be included within the scope of this invention.

The following examples will more fully illustrate the embodiments herein. In the examples, all parts and percentages are given by weight and all temperatures are in degrees Celsius unless otherwise noted. Inherent viscosities of the polyimide resins were determined on 1 g./dl. solutions at 25° C. in N-methylpyrrolidinone. The following test procedures were used.

TENSILE LAP SHEAR STRENGTH

This is determined using aluminum panels of 2024-T3 alloy with dimensions of $1 \times 6 \times 0.0625$ in. The panels are chromic acid etched prior to bonding with the adhesive to be tested. The adhesive is applied between the panels and clamped in place with a 0.5 in. overlap, thereby giving an area to be tested of 0.5 in.$^2$. After the indicated curing, the cooled panels are pulled apart on an Instron tester at a pull rate of 0.05 in./min. The procedure is generally as described in ASTM D1002.

VOLUME RESISTIVITY

The volume resistivity (VR) was determined by placing two parallel strips of tape (e.g. 3M Miracle Scotch tape) spaced 0.100 in. apart, along the length of a standard $1 \times 3$ in. glass slide. A dab of the adhesive to be tested is placed in the space between the tape strips. Using a single edge razor held at a 45° angle, the adhesive is uniformly spread into the 100 mil space between the test strips. The tape is removed and the coated slide is placed in a preheated oven for curing at the indicated time and temperature. The slide is then removed and, using either a two or four pole resistance bridge, the resistance of a 1-in. length of the cured adhesive strip is measured. This is done by positioning the inboard contacts exactly 1-in. apart. If a two pole bridge is used, subtract the resistance of the leads. To convert the reading to ohm-cm., multiply the resistance number (R) by 0.0005. This factor assumes the strip width at 0.100 in., the cured adhesive thickness at 0.002 in., and the distance between contacts at 1 in. The formula is as follows:

$$VR(\text{ohm-cm.}) = R(\text{ohm}) \times \frac{\text{cross sectional area (cm.}^2\text{)}}{\text{length (cm.)}}$$

Alternatively, if the strip width is 0.100 in. but the cured adhesive thickness is not the width given above, a conversion factor of 0.254 may be used with any thickness (in inches).

The lower the volume resistivity, the better the electrical conductivity.

EXAMPLE I

This example describes the preparation of carbinol-containing polyimides by the reaction of the bis(methyl half-ester) of 3,3',4,4'-benzhydroltetracarboxylic acid and various diamines. It also describes the preparation of the half-ester.

Preparation of Bis(methyl half-ester) of 3,3',4,4'-Benzhydroltetracarboxylic Acid A total of 241.7 g. (0.75 mole) of 3,3',4,4'-benzophenonetetracarboxylic dianhydride was refluxed with stirring for 2 hours with 400 ml. of methanol. The solution was cooled and charged to a one l. autoclave along with 100 ml. methanol, 10 g. of 5% palladium on activated carbon, and 5 drops of N,N-diethyl nicotinamide. Hydrogenation of the resulting bis(methyl half-ester) of 3,3',4,4'-benzhydroltetracarboxylic acid was carried out at 25°-30° C. and 100-150 psi until the rate of hydrogen uptake decreased sharply. The solution was gravity filtered, and the filter paper and its contents were washed with methanol. The yield was 584.6 g., which corresponded to 779.5 g. of solution per mole. The $C^{13}$ NMR spectrum indicated that hydrogenation of the ketone of carbinol was 90% complete and that there was no hydrogenolysis of the alcohol (i.e. no $CH_2$ formation).

Preparation of the Polyimide

A 500 ml. round bottom, 4-neck flask was charged with 0.12 moles (93.5 g.) of the above solution containing the half-ester, 0.09 moles (17.8 g.) of 4,4'-methylenedianiline, and 85 ml. of N-methylpyrrolidinone (NMP). The methanol was removed by vacuum distillation up to a pot temperature of 110° C. and a vacuum of 20 mm Hg. A total of 65 ml. of toluene was added and the flask was fitted with a 30 ml. Dean-Stark receiver. The solution was refluxed until the water-methanol mixture ceased to evolve (about 3–4 hours). The toluene was then removed by vacuum distillation. The resulting polyimide (A-1) had an inherent viscosity of 0.10.

Additional polyimides were prepared using above half-ester and the same general procedure except that an equimolar amount of starting materials or an excess of diamine were used as well as an excess of the half-ester. The diamine used, molar ratio, and inherent viscosity are given below.

| Polyimide Designation | Diamine | Molar Ratio of Tetracarboxylic Compound To Diamine | Inherent Viscosity |
|---|---|---|---|
| A-1 | 4,4'-methylenedianiline | 4/3 | 0.10 |
| A-2 | 4,4'-methylenedianiline | 2/1 | 0.17 |
| A-3 | 4,4'-methylenedianiline | 5/4 | 0.18 |
| A-4 | 4,4'-methylenedianiline | 6/5 | 0.29 |
| A-5 | 4,4'-methylenedianiline | 9/8 | 0.09 |
| A-6 | 4,4'-methylenedianiline | 12/11 | 0.19 |
| B | 4,4'-oxydianiline | 4/3 | 0.22 |
| C | 4,4'-sulfonyldianiline | 4/3 | 0.17 |
| D | 4,4'-bis(3-aminobenzoyl) diphenyl ether | 4/3 | 0.14 |
| E | bis(3-aminopropyl) tetramethyl disiloxane | 4/3 | 0.37 |
| F | m-phenylenediamine | 4/3 | 0.21 |
| G | 1,6-hexanediamine | 4/3 | 0.19 |
| H | 1,3-bis(3-aminophenoxy) benzene | 4/3 | 0.20 |
| I-1* | 4,4'-oxydianiline | 1/1 | 0.18 |
| I-2* | 4,4'-oxydianiline | 1/1 | 0.12 |
| K-1 | 4,4'-oxydianiline | 3/4 | 0.08 |
| K-2 | 4,4'-oxydianiline | 5/6 | 0.10 |
| K-3 | 4,4'-oxydianiline | 7/8 | 0.12 |

*Prepared according to the procedure of Example 3 of European Patent Application No. 82401866.7 cited previously.

EXAMPLE II

This example describes the preparation of a silver-filled polyimide/polyepoxide blend and demonstrates the improved conductivity provided by the addition of the polyepoxide. The polyimide used was the one designated B prepared from 4,4'-oxydianiline using a 4/3 molar ratio (see Example I). The polyepoxide was 1,4-butanediol diglycidyl ether (BDDGE), a liquid aliphatic diepoxide (sold by Ciba-Geigy as DY-026) having the structure

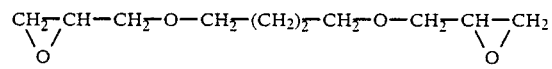

and an epoxide equivalent weight of about 134. The powdered silver used was a product called Silver Flake AB having a Hall apparent density of 2.47 g./cc. and particle size of minus 325 mesh (sold by Chemet Corp.). The blends were prepared by mixing the N-methylpyrrolidone (NMP) solution of the polyimide (PI) with the polyepoxide (PE), adding the silver (Ag), and hand mixing until the blend was smooth and consistent.

They were evaluated for conductivity by determining the volume resistivity and as adhesives by determining tensile lap shear strengths, both after curing for 1 hr. at 150° C. and 1 hr. at 200° C. In the blends designated D-1 and D-2, 1,5-diazobicyclo(5.4.0)undec-5-ene (DBU) was used as a catalytic curing agent. Comparative adhesives containing the indicated amounts of PI, NMP and PE, but no Ag, were also prepared and evaluated.

The formulations and conductivity test results are given in Table I. The effect of the silver addition on the tensile shear strength is shown in Table II.

TABLE I

| Designation | Blend PI % B | PE % BDDGE | NMP % | Ag % based on a. | Ag % based on b. | DBU % based on PE | Volume Resistivity ohm-cm. |
|---|---|---|---|---|---|---|---|
| Control | 40 | — | 60 | 80 | — | — | 0.0038 |
| A-1 | 40 | 6 | 54 | 80 | 78 | — | 0.00026 |
| B-1 | 40 | 18 | 42 | 80 | 73 | — | 0.000045 |
| C-1 | 37 | 31.5 | 31.5 | 80 | 68 | — | 0.000035 |
| D-1 | 40 | 18 | 42 | 80 | 73 | 2 | 0.000039 |
| D-2 | 40 | 18 | 42 | 80 | 73 | 8 | 0.000037 |
| Control | 40 | — | 60 | 60 | — | — | too high* |
| E-1 | 40 | 12 | 48 | 60 | 53 | — | 0.006 | a. PI
b. PI, PE, and DBU
*Off scale (R is >1 M ohm)

TABLE II

| | Tensile Lap Shear Strength - psi (M Pa) | |
|---|---|---|
| Blend Designation | | Comparative - no Ag |
| Control | 1520 (10.48) | 2990 (20.62) |
| A-1 | 910 (6.28) | 1420 (9.79) |
| B-1 | 490 (3.38) | 1710 (11.79) |
| C-1 | 620 (4.28) | 2000 (13.79) |
| D-1 | 870 (6) | 1710 (11.79) |
| D-2 | 720 (4.97) | 1710 (11.79) |

The results show that blends containing the polyepoxide show an unexpectedly large increase in conductivity as demonstrated by their decreased resistivity which was as much as 100 hundredfold. Blends containing as little as 6% polyepoxide showed this increase. Increasing the amount of polyepoxide above 18% in the blends did not significantly change the resistivity; however, it did adversely affect the tensile shear strength. The reduction in strength was lessened by the use of the catalyst, the strength increasing from a low of 490 (B-1) to 870 and 720 (D-1 and D-2) with the addition to the same blend of 2 and 8% catalyst. The filled polyimide control and filled polyimide/polyepoxide blends had strengths lower than the non-filled polyimide (1520 vs. 2990 psi) and non-filled polyimide/polyepoxide blends results are given in Table III. For comparison silver-filled polyepoxides containing DBU as catalyst were also evaluated.

TABLE III

| Designa-tion* | Blend | | | | | DBU % based on PE | Volume Resistivity ohm-cm. | Tensile Lap Shear Strength psi (M Pa) |
|---|---|---|---|---|---|---|---|---|
| | PI % B | PE % | NMP % | Ag % based on | | | | |
| | | | | a. | b. | | | |
| Control | 35 | — | 65 | 80 | — | — | 0.029 | 1025 (7.07) |
| A | 35 | 19.5 of ADEC | 45.5 | 80 | 72 | 5 | 0.000063 | 1250 (8.62) |
| B | 35 | 19.5 of DGEBPA | 45.5 | 80 | 72 | 5 | 0.000097 | 1280 (8.83) |
| Comparative | — | 100 of ADEC | — | 80 | 79 | 5 | 0.5 | very low |
| Comparative | — | 100 of DGEBPA | — | 80 | 79 | 5 | 0.000092 | very low | a. PI
b. PI, PE, and DBU
*A and B were cured for 30 min. at 150° C. and then 1 hr. at 200° C.; the control was cured for 45 min. at 150° C. and then 1 hr. at 200° C.; the comparative blend was cured for 1 hr. at 200° C.

(490–910 psi vs. 1420–2000).

The results also show that there was a significant increase in conductivity when only 60% silver was used in the blend.

EXAMPLE III

This example shows the results obtained using the above polyimide (B) with other polyepoxides. The polyepoxide used were liquid alicyclic diepoxy carboxylate (ADEC) (sold by Ciba-Geigy as CY-179) having the structure

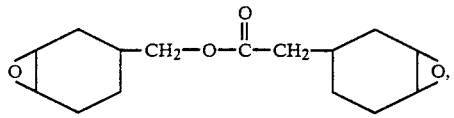

(epoxide equivalent weight of about 131–143, average molecular weight of about 252, and viscosity of about 350–450 cps. at 25° C.) and a liquid diglycidyl ether of bisphenol A (DGEBPA) (sold by Dow Chemical Co. as DER 332) having the formula

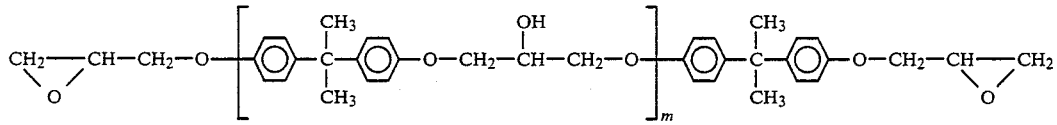

(epoxide equivalent weight of about 172–176, average molecular weight of about 350, and viscosity of about 4,000–6,000 cps. at 25° C.). The formulations and test The results show even greater reductions in the resistivity—i.e., >400 fold over the PI control containing no PE. The strengths were better than the control and better than catalyst cured blends of Example II (870 and 720 for D-1 and D-2 vs. 1250 and 1280 for A and B). The metal-filled polyepoxides varied in resistivity and were very low in strength.

EXAMPLE IV

This example shows the results obtained using other polyimides. The polyimides (see Example I) included A-1, A-2 and A-6 [prepared from 4,4'-methylenedianiline using 4/3, 2/1, and 12/11 molar ratios]; C [prepared from 4,4'-sulfonyldianiline using a 4/3 molar ratio]; D [prepared from 4,4'-bis(3-aminobenzoyl)diphenyl ether using a 4/3 molar ratio]; E [prepared from bis(3-aminopropyl)tetramethyl disiloxane using a 4/3 molar ratio]; F [prepared from m-phenylenediamine using a 4/3 molar ratio]; I-1 and I-2 [prepared from 4,4'-oxydianiline using a 1:1 molar ratio]; K-1, K-2 and K-3 [prepared from 4,4'-oxydianiline using 3/4, 5/6 and 7/8 molar ratios]. The epoxies used are indicated. The formulations and test results are given in Table IV. Cure was for 30 min. at 150° C. and then 1 hr. at 200° C.

TABLE IV

| Designation | Blend | | | | | DBU % based on PE | Volume Resistivity ohm-cm. | Tensile Lap Shear Strength psi (M Pa) |
|---|---|---|---|---|---|---|---|---|
| | PI % | PE % | NMP % | Ag % based on | | | | |
| | | | | a. | b. | | | |
| Control | 31 of A-1 | — | 69 | 80 | — | — | 0.00016 | 1300 (8.96) |
| A-1 | 31 of A-1 | 20.7 ADEC | 48.3 | 80 | 70 | 5 | 0.000061 | 590 (4.07) |
| A-2 | 31 of A-1 | 20.7 DGEBPA | 48.3 | 80 | 70 | 5 | 0.000016 | 790 (5.45) |
| A-3 | 31 of A-1 | 20.7 BDDGE | 48.3 | 80 | 70 | 5 | 0.000038 | 570 (3.93) |
| Control | 40 of | — | 60 | 80 | — | — | too high* | 810 |

TABLE IV-continued

| Desig-nation | Blend PI % | PE % | NMP % | Ag % based on a. | Ag % based on b. | DBU % based on PE | Volume Resistivity ohm-cm. | Tensile Lap Shear Strength psi (M Pa) |
|---|---|---|---|---|---|---|---|---|
| | A-2 | | | | | | | (5.59) |
| A-4 | 40 of A-2 | 6 of BDDGE | 54 | 80 | 78 | — | 0.00019 | 765 (5.28) |
| Control | 32 of A-6 | — | 68 | 80 | — | — | 0.0042 | N.M. |
| A-5 | 25 of A-6 | 22.5 of BDDGE | 52.5 | 80 | 68 | — | 0.00018 | N.M. |
| Control | 35 of C | — | 65 | 80 | — | — | 0.034 | 740 (5.10) |
| B-1 | 35 of C | 19.5 of ADEC | 45.5 | 80 | 72 | 5 | 0.000061 | 470 (3.24) |
| B-2 | 35 of C | 19.5 of DGEBPA | 45.5 | 80 | 72 | 5 | 0.000075 | 1025 (7.07) |
| Control | 35 of D | — | 65 | 80 | — | — | >35 | 680 (4.69) |
| C-1 | 35 of D | 19.5 of ADEC | 45.5 | 80 | 72 | 5 | 0.000053 | 900 (6.21) |
| C-2 | 35 of D | 19.5 of DGEBPA | 45.5 | 80 | 72 | 5 | 0.00012 | 1105 (7.59) |
| Control | 29.5 of E | — | 70.5 | 80 | — | — | too high* | N.M. |
| D | 29.5 of E | 21 of DGEBPA | 49.5 | 80 | 70 | — | 0.000088 | N.M. |
| Control | 29 of F | — | 71 | 80 | — | — | too high* | 1140 (7.86) |
| E | 29 of F | 21 of BDDGE | 50 | 80 | 70 | — | 0.012 | 1000 (6.90) |
| Control | 30 of I-1 | — | 70 | 80 | — | — | 0.21 | N.M. |
| F-1 | 30 of I-1 | 14 of BDDGE | 56 | 80 | 73 | — | 0.00013 | N.M. |
| Control | 40 of I-2 | — | 60 | 80 | — | — | 0.00079 | N.M. |
| F-2 | 40 of I-2 | 12 of BDDGE | 48 | 80 | 75 | — | 0.000053 | N.M. |
| Control | 40 of K-1 | — | 60 | 80 | — | — | 0.00266 | N.M. |
| G-1 | 40 of K-1 | 12 of BDDGE | 48 | 80 | 75 | — | 0.000103 | N.M. |
| Control | 40 of K-2 | — | 60 | 80 | — | — | 0.0043 | N.M. |
| G-2 | 40 of K-2 | 12 of BDDGE | 48 | 80 | 75 | — | 0.00018 | N.M. |
| Control | 40 of K-3 | — | 60 | 80 | — | — | 0.096 | N.M. |
| G-3 | 40 of K-3 | 12 of BDDGE | 48 | 80 | 75 | — | 0.00063 | N.M. | a. PI
b. PI, PE, and DBU
*Off scale (R is >1 M ohm)
N.M. - not measured.

The results show that comparable and even greater decreases in resistivity resulted from adding the various polyepoxides. The results also show that polyimides prepared using equimolar amounts of the tetracarboxylic compound and diamine or an excess of the tetracarboxylic compound or diamine can be used. A polyimide containing no flexibilizing moiety [that prepared from m-phenylenediamine] can also be used in the blends herein. The effect of the polyepoxide addition on the strength varied depending not only the type of polyepoxide used but also the polyimide used. See for example, the blends designated B-1 and B-2 where with the same polyimide the strength decreased or increased depending upon the polyepoxide used; the blends designated C-1 and C-2 where both of the polyepoxides improved the strength; and the blends designated A-1, A-2, and A-3 where none of the polyepoxides improved the strength.

EXAMPLE V

This example demonstrates that other solvents can be used. The blend contained 35% of the polyimide prepared from 4,4'-oxydianiline as an NMP solution (B of Example I), 19.5% of the epoxy designated BDDGE, the indicated amount of solvent(s) and 80% silver (based on B)—72% (based on B and BDDGE). Cure was for 30 min. at 150° C. and 1 hr. at 200° C. The results are shown in Table V.

TABLE V

| Solvent | (% by wt.)* | Volume Resistivity ohm-cm. |
|---|---|---|
| NMP | 45.5 | 0.000059 |
| NMP | 31.0 | 0.000069 |
| Dimethyl acetamide | 14.5 | |
| NMP | 31.0 | 0.000061 |
| Butyl cellosolve acetate | 14.5 | |
| NMP | 31.0 | 0.000065 |

TABLE V-continued

| Solvent | (% by wt.)* | Volume Resistivity ohm-cm. |
|---|---|---|
| Carbitol acetate | 14.5 | |

*Based on the PI, PE, and solvent(s) totaling 100%

The results show that the reduction in volume resistivities were comparable for the mixed solvents and only slightly less than with NMP. The NMP control containing 35% B, 65% NMP, 80% Ag (based on B), and no epoxy had a VR of 0.029.

EXAMPLE VI

This example studies the effect of the polyepoxide addition on the thermal stability. The blend evaluated contained 35% of the polyimide prepared from 4,4'-oxydianiline (B of Example I), 19.5% of the epoxy designated ADEC, 45.5% NMP, 80% silver powder (based on B)—72% (based on B and ADEC), and 5% DBU catalyst (based on ADEC). It was cured for 30 min. at 150° C. and 1 hr. at 200° C. The scan rate was 10° C. per minute over a temperature range from 30° to 630° C. in a nitrogen atmosphere. The % weight loss to 250° C. was minimal. At 350° C. it was 4.8%; at 400° C. 8.3%; and at 630° C. only about 13%.

A similar blend containing 19.5% of the epoxide designated BDDGE (instead of ADEC) and the same amount of the other components was cured and evaluated. The % weight loss to 250° C. was minimal. At 350° C. it was 2.2%; at 400° C., 4.3%; and at 630° C. only 9%. The thermal stability was better than with ADEC.

The control containing no polyepoxide or catalyst also showed minimal weight loss to 250° C. and weight losses at 350°, 400°, and 630° C. of 1.8%, 2.4%, and about 6%. The results show that the thermal stabilities were reduced somewhat over that of the control at temperatures over 250° C. but were still acceptable.

EXAMPLE VII

This example demonstrates that the use of a polyimide which contained no carbinol groups did not produce the conductivity improvement.

A polyimide resin was prepared as in Example I except that the 3,3',4,4'-benzophenonetetracarboxylic dianhydride was only converted to the bis(methyl halfester) and was not hydrogenated to convert the carbonyl groups to carbinol groups. The diamine used was 3,3'-bis(3-aminophenoxy)-benzene. The molar ratio of tetracarboxylic acid compound to diamine was 4/3. The resulting polyimide had an intrinsic viscosity of 0.14 in NMP.

A silver-filled blend of the above polyimide (33%) with 20% of the epoxy designated BDDGE, 47% NMP, and 80% Ag (based on PI)—71% (based on PI and BDDGE) showed no reduction in volume resistivity—both the reading for the blend and the control (no PE) were too large to measure (off-scale—i.e., R was >1M ohm). Cure was for 30 min. at 150° C. and 1 hr. at 200° C. A silver-filled blend of 35% of the polyimide with 13% of the epoxide, 52% NMP, and 80% silver (based on PI) likewise showed no reduction in volume resistivity (R was >1M ohms for both the blend and the control.

As will be shown in Example IX—Part B, polyimides prepared from the same amine but with the carbinol containing tetracarboxylic acid compound showed the conductivity improvement.

EXAMPLE VIII (comparative)

This example demonstrates that there was no increase in conductivity when a metal other than a noble metal was used. The polyimide used was that prepared from 4,4'-oxydianiline (see B of Example I); the polyepoxides used were those designated BDDGE and ADEC. The metal powder was a nickel flake having an apparent density of 1.30 g./cc. (sold by Novamet). The formulations and test results are given in Table VI. Cure was for 30 min. at 150° C. and 1 hr. at 200° C.

TABLE VI

| | Blend | | | | | |
|---|---|---|---|---|---|---|
| PI % | PE % | NMP % | Ni % based on a. | Ni % based on b. | DBU % based on PE | Volume Resistivity (ohm-cm) |
| 35 (Control) | — | 65 | 80 | — | — | 0.01 |
| 35 | 19.5 of BDDGE | 45.5 | 80 | 72 | — | 0.31 |
| 35 | 19.5 of ADEC | 45.5 | 80 | 72 | 5 | 30.0 | a. PI
b. PI, PE, and DBU

The results show that there was no decrese in resistivity—rather there was an increase. With a 50/50 blend of nickel and silver [35% PI, 19.5% BDDGE, 45.5% NMP, and 80% metal (based on PI)—72% (based on PI, PE and DBU)] the volume resistivity was greater than 200 ohm-cm.

EXAMPLE IX

This example shows the use of other epoxides including an aliphatic monoepoxide, a solid polyepoxide, and other liquid polyepoxides.

Part A (comparative)

The polyimide used was prepared from 1,3-bis(3-aminophenoxy)benzene (see H of Example 1). The monoepoxide designated AME (sold by Ciba-Geigy as DY027) was the mixed glycidyl ether of octanol and decanol which had the formula

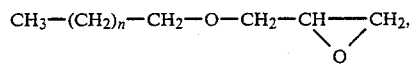

where n is 6 and 8. Its epoxide equivalent weight was about 215-235, average molecular weight about 228, and viscosity at 25° C. 5-15 cps. The polyepoxide designated solid DGEBPA (sold by Dow as DER 661) was the diglycidyl ether of bisphenol A. It had an epoxide equivalent weight of about 475-575 and average molecular weight of 1050 (the formula is shown in Example III).

Part B

The liquid polyepoxides used in the previous examples (designated BDDGE, ADEC and DGEBPA) and other liquid polyepoxides (designated EPNPE and DGEBPF) were evaluated with the above polyimide. The epoxide designated EPNPE (sold by Dow as DEN 431) had an epoxide equivalent weight of about 172-179 and average molecular weight of about 350. It had the formula

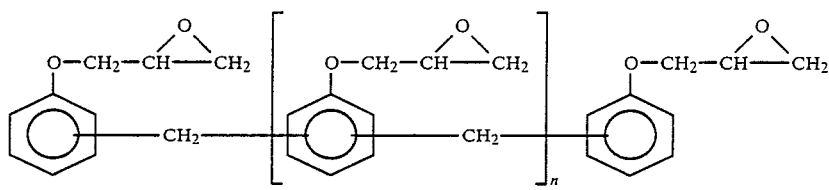

The epoxide designated DGEBPF (sold by Dainippon Ink and Chemical as 830-S) was the diglycidyl ether of bisphenol F. It had an epoxide equivalent weight of about 170–190 and average molecular weight of about 360. It had the formula

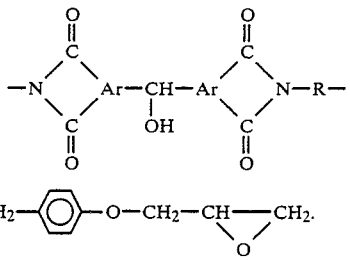

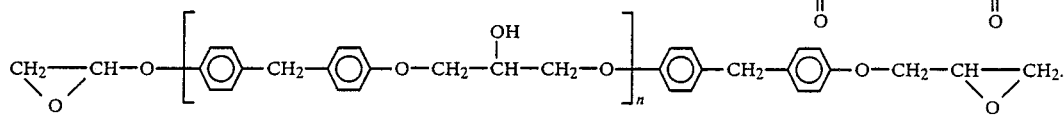

The formulations and test results for Part A and B are given in Table VII. Cure was for 30 min. at 150° C. and 1 hr. at 200° C.

TABLE VII

| PI % | PE % | NMP % | Ag % based on a. | Ag % based on b. | Volume Resistivity (ohm-cm) |
|---|---|---|---|---|---|
| 40 (Control) | — | 60 | 80 | — | too high[c] |
| 40 | 12 of AME (Comparative) | 48 | 80 | 75 | too high[d] |
| 40 | 12 of solid DGEBPA (Comparative) | 48 | 80 | 75 | too high[d] |
| 40 | 12 of BDDGE | 48 | 80 | 75 | 0.000055 |
| 40 | 12 of ADEC | 48 | 80 | 75 | 0.000053 |
| 40 | 12 of DGEBPF | 48 | 80 | 75 | 0.000078 |
| 40 | 12 of EPNPE | 48 | 80 | 75 | 0.000084 | a. PI
b. PI, PE, and DBU.
c. R was >1 M ohm.
d. R was >20K ohm.

The results show there was no increase in conductivity when the liquid monoepoxide or solid polyepoxide were used. The same polyepoxide (i.e., DGEBPA) in liquid form showed the conductivity increase (see Table III). The results also show that other liquid polyepoxides provide the conductivity improvement.

Summarizing, this invention provides noble metal-filled blends of carbinol-containing polyimides and liquid polyepoxides characterized by their improved conductivity.

Now that the preferred embodiments of the present invention are described in detail, various modifications and improvements thereon will be readily apparent to those skilled in the art. Accordingly, the spirit and scope of the invention are to be limited only by the appended claims, and not by the foregoing specification.

What is claimed is:

1. A metal-filled polyimide/polyepoxide blend, characterized by its improved conductivity after curing over the blend without polyepoxide, which comprises:
   (a) about 25–50% of a carbinol-containing polyimide consisting essentially a repeat unit having the structure:

wherein Ar is the same or different aromatic radical with the two pairs of attached carbonyl groups situated on adjacent carbon atoms in the Ar radical and R is a divalent aliphatic, cycloaliphatic, aromatic, or heterocyclic radical;
   (b) about 1–35% of a liquid substituted or unsubstituted alphatic, cycloaliphatic, aromatic, and/or heterocyclic polyepoxide containing at least two epoxy groups; and
   (c) about 15–74% of an organic solvent for the polyimide; the percentages of (a), (b), and (c) being by weight and totaling 100%; and
   (d) about 45–90% by weight of an electrically conductive noble metal powder; the percentage of (d) being by weight based on the total weight of the polyimide and polyepoxide.

2. The blend of claim 1, wherein Ar is

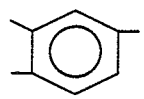

3. The blend of claim 1, wherein R is

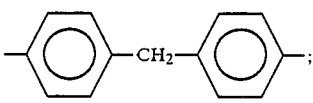

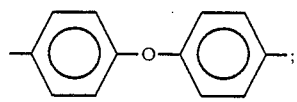

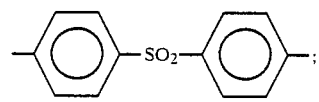

-continued

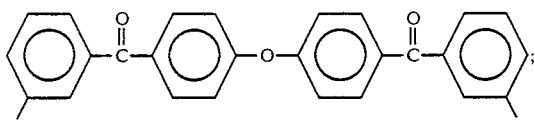

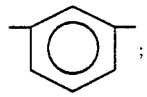

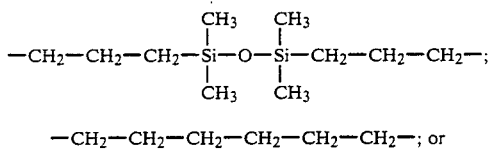

—CH₂—CH₂—CH₂—CH₂—CH₂—CH₂—; or

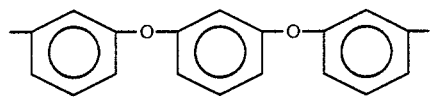

4. The blend of claim 1, wherein the polyepoxide is a low molecular weight, low viscosity polyepoxide.

5. The blend of claim 1, wherein the solvent is selected from the group consisting of N-methylpyrrolidinone, dimethylacetamide, butyl cellosolve acetate, carbitol acetate, and mixtures thereof.

6. The blend of claim 1, wherein the metal powder is selected from the group consisting of gold, silver, platinum, palladium, iridium, and mixtures thereof.

7. The blend of claim 1, wherein the polyimide is present in an amount of about 25-40% and Ar is

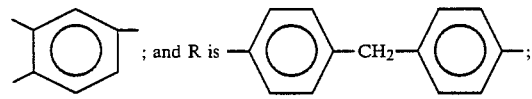

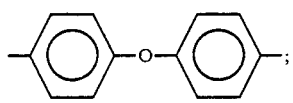

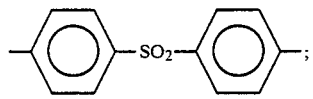

-continued

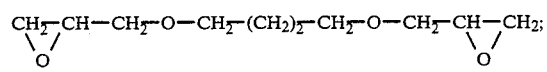

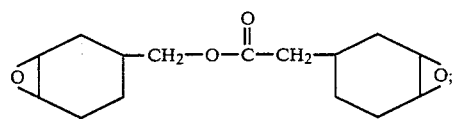

—CH₂—CH₂—CH₂—CH₂—CH₂—CH₂—; or

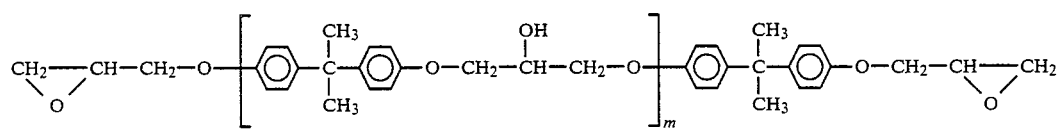

8. The blend of claim 1, wherein the polyepoxide is present in an amount of about 6-32% and is a low molecular weight, low viscosity polyepoxide.

9. The blend of claim 1, wherein the solvent is present in an amount of about 25-70% and is selected from the group consisting of N-methylpyrrolidinone, dimethylacetamide, butyl cellosolve acetate, carbitol acetate, and mixtures thereof.

10. The blend of claim 1, wherein the metal powder is present in an amount of about 50-85% and is selected from the group consisting of gold, silver, platinum, palladium, iridium, and mixtures thereof.

11. The blend of claim 10, wherein the polyepoxide is an aliphatic diepoxide; an alicyclic diepoxy carboxylate; a diglycidyl ether of bisphenol A; a diglycidyl ether of bisphenol F; or an epoxy phenol novolac.

12. The blend of claim 11, wherein the aliphatic diepoxide has the structure $$CH_2-CH-CH_2-O-CH_2-(CH_2)_2-CH_2-O-CH_2-CH-CH_2;$$
$$\diagdown O \diagup \qquad\qquad\qquad\qquad\qquad \diagdown O \diagup$$

or wherein the alicyclic diepoxy carboxylate has the structure

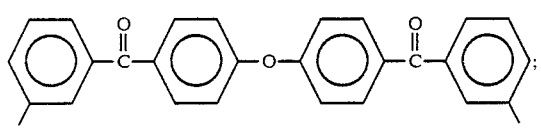

or wherein the diglycidyl ether of bisphenol A has the structure where m is 0 or greater; wherein the diglycidyl ether of bisphenol F has the structure

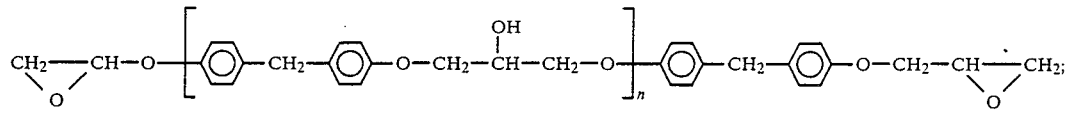

and wherein the epoxy phenol novolac has the structure

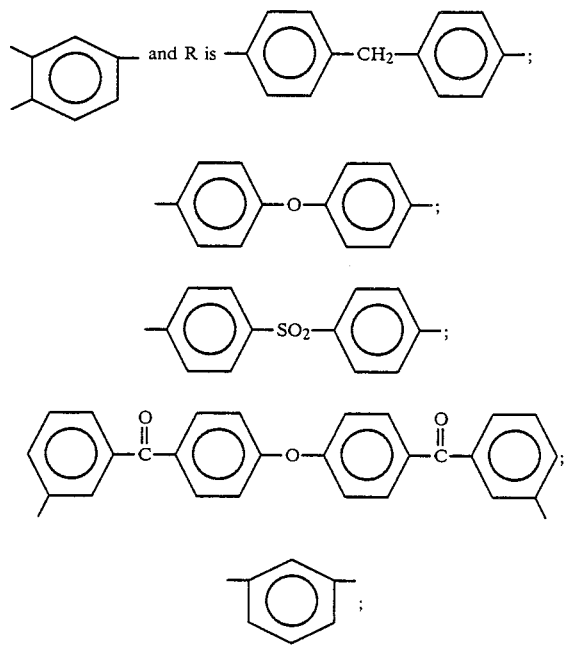

13. The blend of claim 12, wherein the polyimide is present in an amount of about 30–40%; the polyepoxide is present in an amount of about 15–25%; the solvent is present in an amount of about 30–55% and is N-methylpyrrolidinone; and the metal is present in an amount of about 55–80% and is silver.

14. The blend of claim 13, wherein in the polyimide Ar is

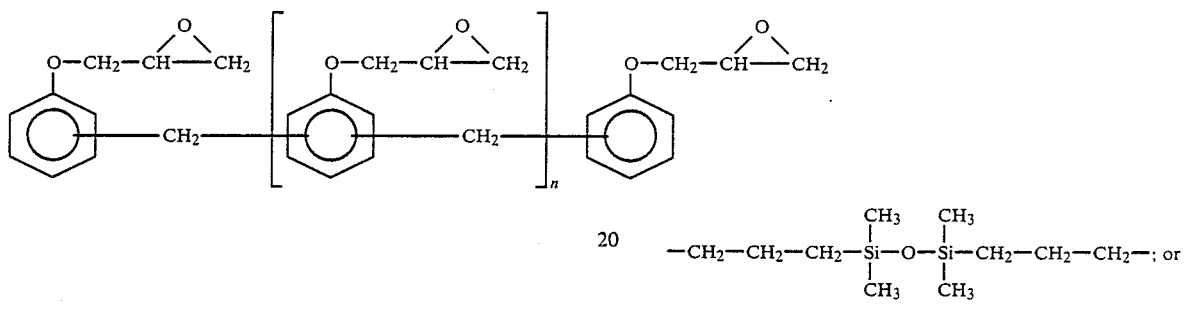

15. The blend of claim 14, characterized in that the electrical conductivity is improved by at least one hundredfold.

16. The blend of claim 1, wherein the carbinol-containing polyimide is prepared by polymerizing and imidizing the bis(methyl half-ester) of 3,3',4,4'-benzhydroltetracarboxylic acid with a diamine selected from the group consisting of 4,4'-methylenedianiline, 4,4'-oxydianiline, 4,4'-sulfonyldianiline, 4,4'-bis(3-aminobenzoyl)diphenyl ether, bis(3-aminopropyl)tetramethyl disiloxane, m-phenylenediamine, 1,6-hexanediamine, and 1,3-bis(3-aminophenoxy)benzene in the solvent for the polyimide using a molar ratio of tetracarboxylic acid compound to diamine of between 12 to 11 and 7 to 8.

17. The blend of claim 16, wherein the solvent is selected from the group consisting of N-methylpyrrolidinone, dimethyl acetamide, butyl cellosolve acetate, carbitol acetate, and mixtures thereof.

18. The blend of claim 16, wherein the polyepoxide is an aliphatic diepoxide; an alicyclic diepoxy carboxylate; a diglycidyl ether of bisphenol A; a diglycidyl ether of bisphenol F; or an epoxy phenolnovolac.

19. The blend of claim 16, wherein the metal is silver.

20. The blend of claim 16, wherein the diamine is 4,4'-methylene dianiline, 4,4'-oxydianiline, or 4,4'-sulfonyldianiline; wherein the molar ratio is between 12 to 11 and 1 to 1; wherein the solvent is N-methylpyrrolidininone; and wherein the polyepoxide is a low viscosity, low molecular weight aliphatic diepoxide or alicyclic diepoxy carboxylate.

* * * * *